UNITED STATES PATENT OFFICE.

PAUL HÜSSY, OF BASEL, SWITZERLAND, ASSIGNOR TO SOCIETY OF CHEMICAL INDUSTRY IN BASLE, OF BASEL, SWITZERLAND.

THERAPEUTICALLY-VALUABLE COMPOUNDS OF THE QUININ GROUP.

1,261,235.  Specification of Letters Patent.  Patented Apr. 2, 1918.

No Drawing.  Application filed May 26, 1917. Serial No. 171,242.

*To all whom it may concern:*

Be it known that I, Dr. Med. PAUL HÜSSY, a citizen of the Swiss Republic, and resident of Basel, Switzerland, have invented new Therapeutically-Valuable Compounds of the Quinin Group, of which the following is a full, clear, and exact specification.

By this invention therapeutically valuable compounds of the alkaloids of the quinin group are made by causing such an alkaloid of the quinin group as for instance quinin, cinchonin, euquinin, apoquinin, ethylcuprein, hydroquinin, ethylhydrocuprein, to interact in molecular proportions, in some cases in presence of a suitable solvent or diluent, with C-C-diallylbarbituric acid in the form either of the free acid or of a salt thereof.

The new compounds are pronounced labor stimulants, extraordinarily reliable and powerfully active, which at the same time produce a desirable sedative and restful effect.

The invention is illustrated by the following examples:

Example 1: A mixture of 65 grams of anhydrous quinin base, 41.6 grams of C-C-diallylbarbituric acid and 200 grams of anhydrous methyl alcohol is boiled in a reflux apparatus for half an hour. After somewhat prolonged standing the quinin-diallylbarbituric acid separates in needle shaped crystals which melt at 128° C. and dissolve in water with some difficulty, easily in ethyl alcohol, methyl alcohol and acetic ether, but not in petroleum ether. The new compound contains 60.91 per cent. of quinin and 39.09 per cent. of diallylbarbituric acid.

Example 2: 65 grams of anhydrous quinin base and 41.6 grams of C-C-diallylbarbituric acid are melted together for some time. The viscous mass is recrystallized from acetic ether, the compound obtained being identical with the product of Example 1.

Example 3: 33.6 grams of anhydrous hydroquinin base are melted with 20.08 grams of diallylbarbituric acid on a paraffin-bath and the product of reaction is recrystallized from alcohol. The hydroquinin-diallylbarbituric acid thus obtained is a white crystalline powder, melting at 104° C. and dissolving easily in the usual organic solvents and difficultly in cold water.

Example 4: 39.6 grams of euquinin are melted with 20.08 grams of diallylbarbituric acid on a paraffin bath and the product of reaction is recrystallized from alcohol. The euquinin-barbituric acid thus obtained is a white, crystalline mass melting at 79° C. It dissolves easily in alcohol, chloroform and benzene and difficultly in water.

Example 5: 29.4 grams of cinchonin, 20.08 grams of diallylbarbituric acid and 120 grams of benzene are boiled in a reflux apparatus for half an hour. After cooling, the cinchonin-diallylbarbituric acid separates in the form of a white crystalline mass melting at 217° C. It is easily soluble in the usual organic solvents and difficultly in water.

Example 6: 34 grams of ethylhydrocuprein, 20.08 grams of diallylbarbituric acid and 150 grams of anhydrous alcohol are boiled in a reflux apparatus for half an hour. After somewhat prolonged standing the ethylhydrocuprein-barbituric acid separates in fine needle shaped crystals. The new compound melts at 135° C., is soluble in the usual organic solvents, but difficultly soluble in water.

What I claim is:

1. As new products the herein described therapeutically valuable compounds of C-C-diallylbarbituric acid and alkaloids of the quinin group, constituting well crystallized substances capable of being melted, difficultly soluble in water and easily soluble in ethyl alcohol, methyl alcohol, and acetic ether, but not soluble in petroleum ether.

2. As a new article of manufacture, the herein described therapeutically valuable compound derived from quinin and diallylbarbituric acid, which constitutes a white crystalline substance, melting at 128° C., difficultly soluble in water, easily soluble in ethyl alcohol, methyl alcohol and acetic ether, but insoluble in petroleum ether.

In witness whereof I have hereunto signed my name this 5th day of May, 1917, in the presence of two subscribing witnesses.

Dr. Med. PAUL HÜSSY.

Witnesses:
  CARL O. SPAUMER,
  AMAND RITTER.